US006364278B1

United States Patent
Lin et al.

(12) United States Patent
(10) Patent No.: US 6,364,278 B1
(45) Date of Patent: Apr. 2, 2002

(54) STAND FOR SUPPORTING A COMPUTER

(75) Inventors: Chiu-Chen Lin, Tu-Chen; Nien Chiang Liao, Lu-Chou, both of (TW)

(73) Assignee: Hon Hai Precision Ind. Co., Ltd., Taipei (TW)

( * ) Notice: Subject to any disclaimer, the term of this patent is extended or adjusted under 35 U.S.C. 154(b) by 0 days.

(21) Appl. No.: 09/513,485

(22) Filed: Feb. 25, 2000

(30) Foreign Application Priority Data

Nov. 5, 1999 (TW) ........................................ 088218908

(51) Int. Cl.[7] ................................................ F16M 9/00
(52) U.S. Cl. ........................ 248/676; 248/678; 248/917; 248/346.01; 403/340; 403/381
(58) Field of Search ........................... 248/676, 346.01, 248/918, 924, 346.03, 346.3, 346.5; 403/340, 381

(56) References Cited

U.S. PATENT DOCUMENTS

| 3,787,132 A | * | 1/1974 | Garnett | 403/290 |
|---|---|---|---|---|
| 4,874,099 A | * | 10/1989 | Arnott et al. | 211/50 |
| D327,383 S | * | 6/1992 | Lam | D6/466 |
| 5,192,046 A | * | 3/1993 | Howard | 248/676 |
| 5,295,648 A | * | 3/1994 | Hames | 248/149 |
| 5,397,081 A | * | 3/1995 | Landry et al. | 248/346 |
| 5,687,060 A | * | 11/1997 | Ruch et al. | 361/686 |
| D420,277 S | * | 2/2000 | Burke et al. | D8/380 |
| 6,059,384 A | * | 5/2000 | Ho | 312/223.2 |
| 6,091,602 A | * | 7/2000 | Helot | 361/686 |
| 6,176,641 B1 | * | 1/2001 | Schenk | 403/381 |

* cited by examiner

*Primary Examiner*—Anita King
*Assistant Examiner*—Steven M. Marsh
(74) *Attorney, Agent, or Firm*—WeiTe Chung

(57) ABSTRACT

A stand for supporting a computer comprises a first supporting member and a second supporting member coupled together. The first supporting member includes a first base and a first ledge extending from the first base. The first base forms a first coupling wall and a first protrusion extending from the first coupling wall. A first recess is defined in the first base and exposed to the first coupling wall. The second supporting member includes a second base and a second ledge extending from the second base. The second base forms a second coupling wall for coupling to the first coupling wall and a second protrusion extending from the second coupling wall to be engagingly received in the first recess of the first supporting member. A second recess is defined in the base and exposed to the second coupling wall for engagingly receiving the first protrusion of the first supporting member. The second ledge is spaced from the first ledge to cooperatively receive a computer therebetween.

12 Claims, 5 Drawing Sheets

STAND FOR SUPPORTING A COMPUTER

BACKGROUND OF THE INVENTION

1. Field of the Invention

The present invention relates to a stand for supporting a computer, and particularly to a stand readily coupled by two simple supporting members.

2. Description of Prior Art

A desktop computer generally includes two types: a tower computer and a horizontal computer. Consumers choose the type of the desktop computer in accordance with their needs. For meeting different needs, a computer of a tower type or a horizontal type is provided. Due to the compact size trend, a horizontal type of computer is made thinner than before. If a user wants to let his/her horizontal-type computer to stand like a tower-type computer, the positioning stability of the horizontal-type computer may be unqualified. It is requisite to provide a stand for supporting a horizontal-type computer when it is used like a tower-type computer.

A conventional stand such as disclosed in Taiwan patent application No. 84202486, includes a body and a pair of legs pivotably connecting to the body. The body of the stand is fixed to a computer by bolts for supporting the computer. However, it is complicated to form a plurality of screw holes in the computer for extension of the bolts. Moreover, it is inconvenient to configure the computer to such stand via the bolts.

Another conventional stand such as disclosed in Taiwan patent application No. 84205352, is coupled by two same supporting members. Each supporting member includes a ledge and a coupling portion extending from the ledge. The coupling portion includes an insertion board and a cover adjacent to the insertion board. The cover defines an insertion space for insertion of the insertion board of a complementary member. A plurality of slots is defined in the insertion board and a latch is formed at the cover for extending into the slot thereby coupling the two supporting members. Though this stand can work well, the structure including the manufacture thereof is complicated and high cost.

SUMMARY OF THE INVENTION

Accordingly, an object of the present invention is to provide a stand having a simple structure for supporting a computer.

To fulfil the foregoing object of the present invention, a stand for supporting a computer comprises a first supporting member and a second supporting member coupled together. The first supporting member includes a first base and a first ledge extending from the first base. The first base forms a first coupling wall and a first protrusion extending from the first coupling wall. A first recess is defined in the first base and exposed to the first coupling wall. The second supporting member includes a second base and a second ledge extending from the second base. The second base forms a second coupling wall for coupling to the first coupling wall and a second protrusion extending from the second coupling wall to be engagingly received in the first recess of the first supporting member. A second recess is defined in the base and exposed to the second coupling wall for engagingly receiving the first protrusion of the first supporting member. The second ledge is spaced from the first ledge to cooperatingly receive a computer therebetween

BRIEF DESCRIPTION OF THE DRAWINGS

Other objects and advantages of the present invention will be understood from the following description of a computer enclosure according to a preferred embodiment of the present invention shown in the accompanying drawings, in which.

DETAILED DESCRIPTION OF THE PREFERRED EMBODIMENT

Figure 1:
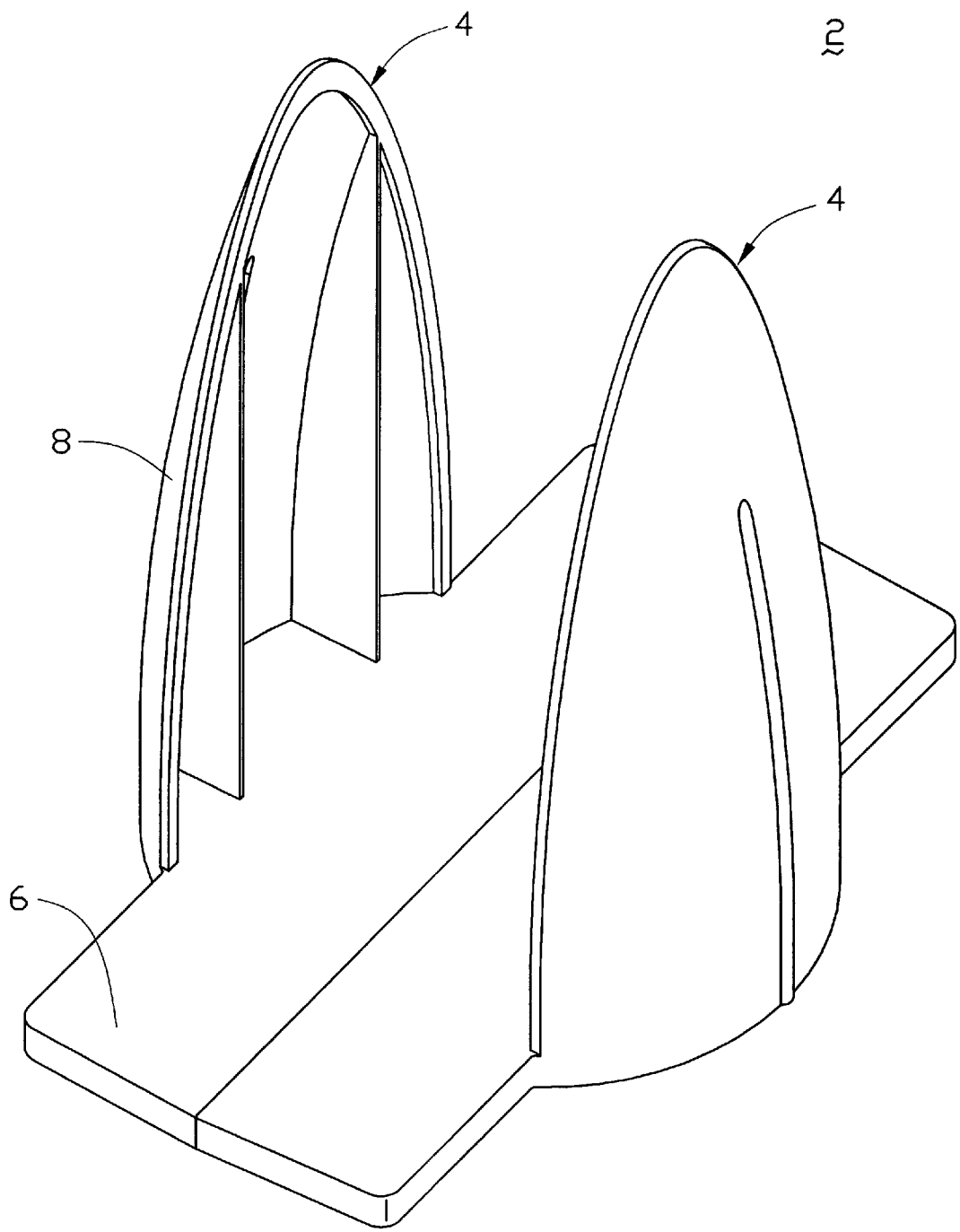
FIG. 1 is a perspective view of a stand for supporting a computer embodying concepts of the present invention.
Figure 2:
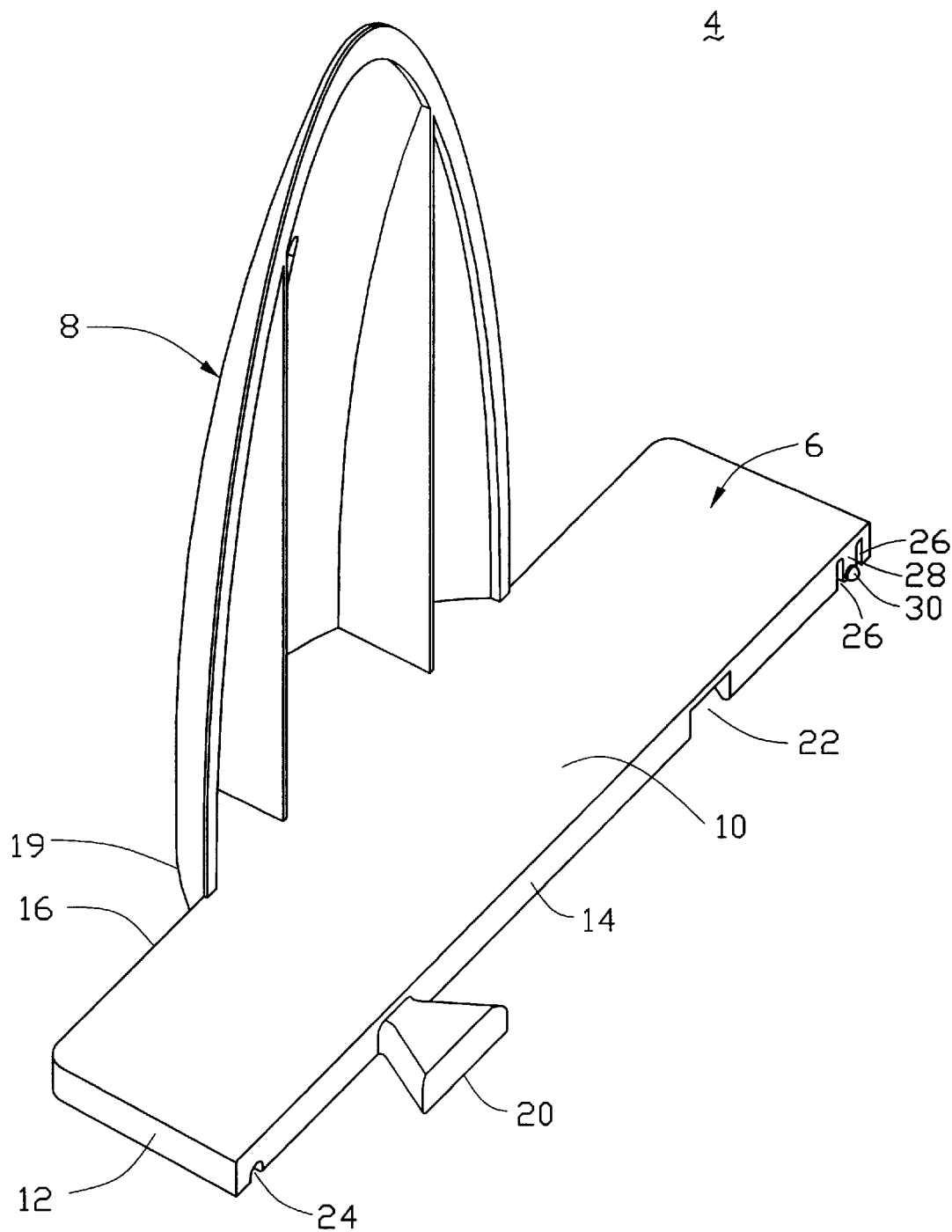
FIG. 2 is a perspective view of a supporting member of FIG. 1.
Figure 3:
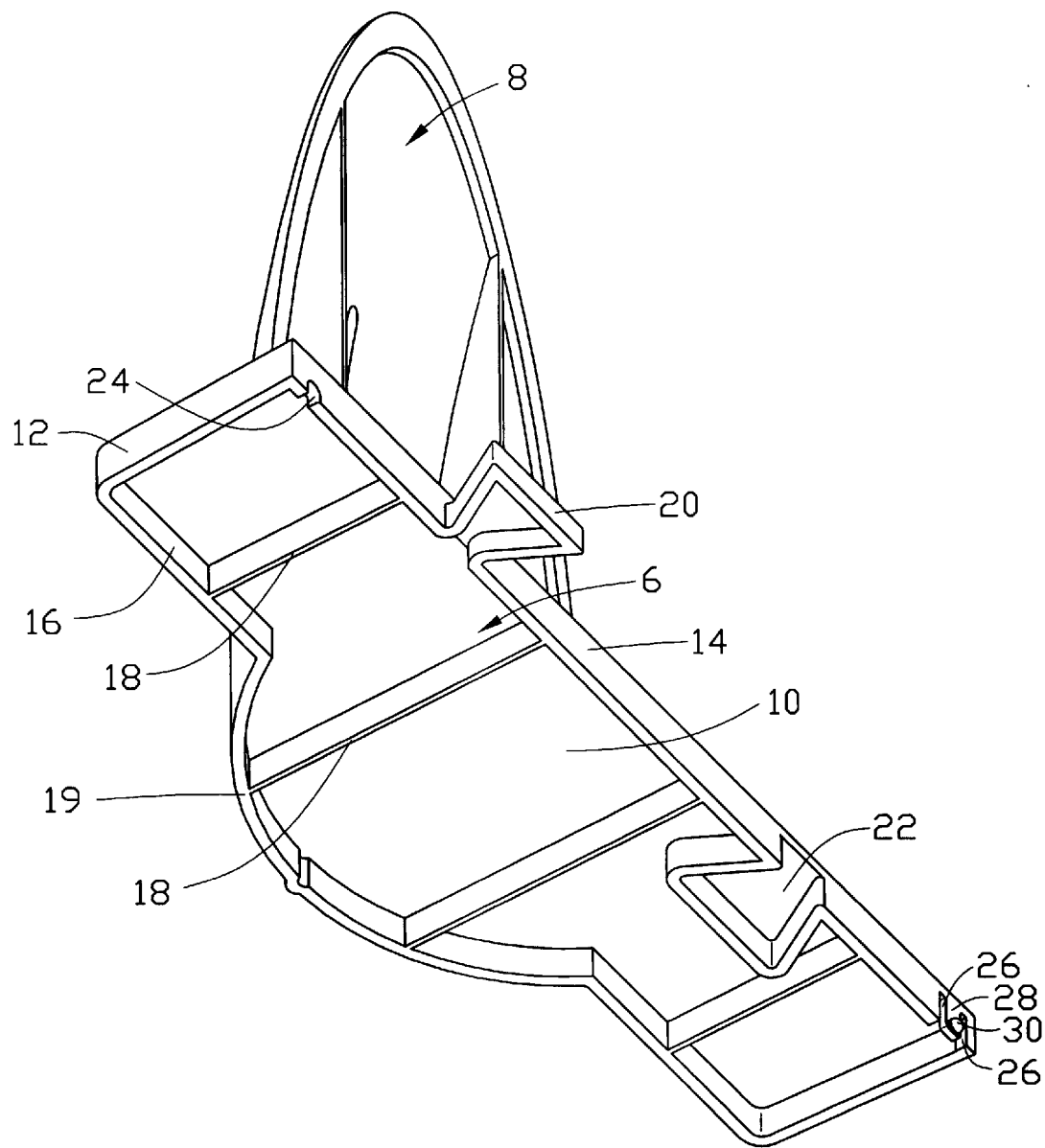
FIG. 3 similar to FIG. 2 showing another side of the supporting member.

Referring to FIG. 1, a stand 2 in accordance with the present invention comprises a pair of complementary supporting members 4 which are mirror images with each other so that both of them are complementarily engaged with each other. Referring to FIGS. 2 and 3, each supporting member 4 includes a base 6 and a ledge 8 extending upward from the base 6. The base 6 includes a panel 10 and a frame 12 extending from edges of the panel 10. The frame 12 includes a coupling wall 14 and a side wall 16 opposite the coupling wall 14. Two pairs of ribs 18 are formed at a bottom surface of the panel 10 between the coupling wall 14 and the side wall 16. The side wall 16 forms an arcuate portion 19 in an intermediate section thereof and the ledge 8 extends upwardly from the arcuate portion 19.

Figure 4:
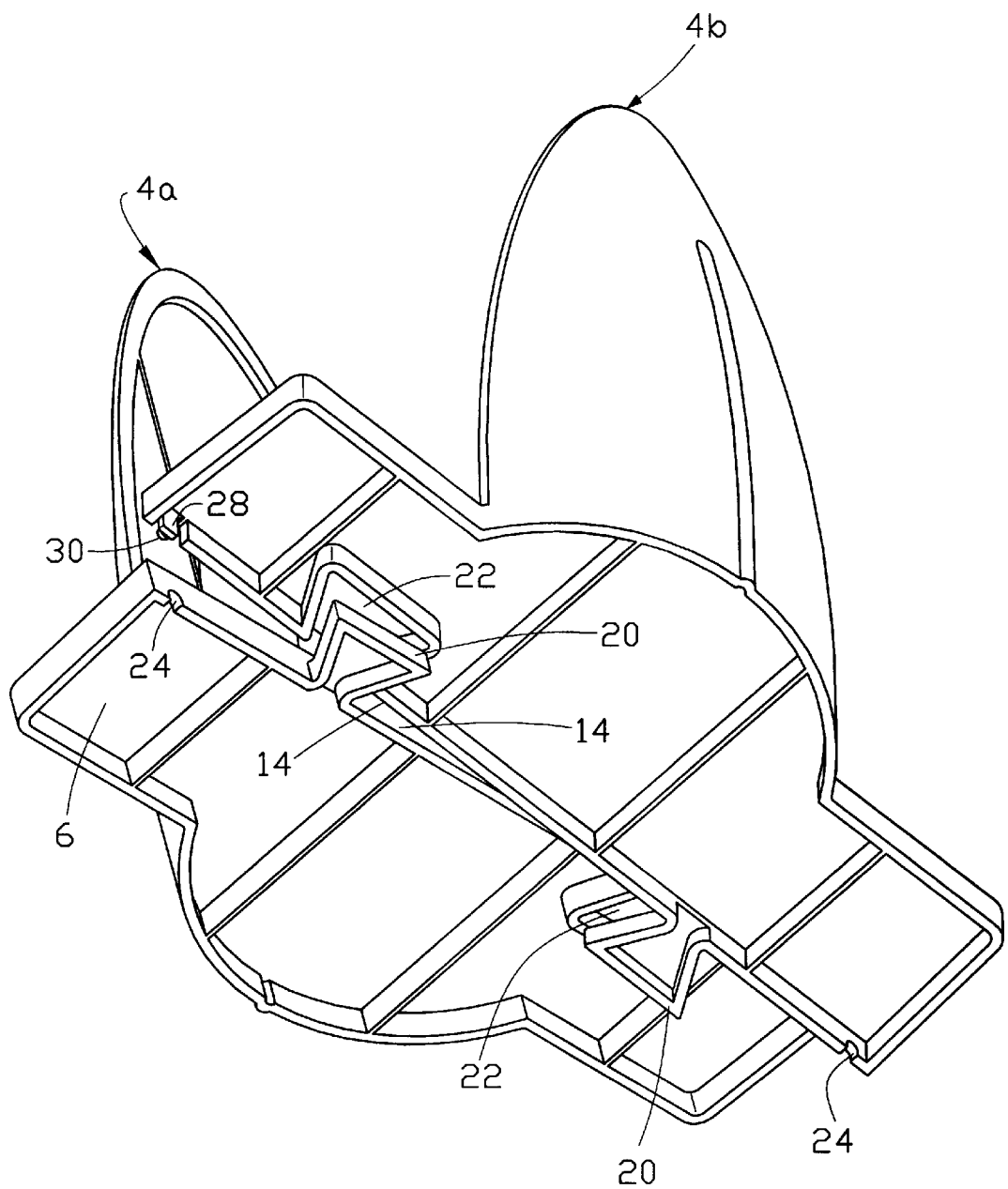
FIG. 4 is a perspective view of two mating supporting members to be coupled together.

A dove-tail shaped protrusion 20 outwardly extends from the coupling wall 14. A dove-tail shaped recess 22 exposed to the coupling wall 14 is defined in the base 6. In size, the dove-tail shaped recess 22 is matingly engageable with the dove-tail shaped protrusion 20, so that the dove-tail shaped recess 22 in one supporting member 4 is capable of engaging with the corresponding dove-tail shaped protrusion 20 in the complementary supporting member 4 as shown in FIG. 4. A notch 24 is defined in a distal end of the coupling wall 14. A pair of slots 26 is parallelly defined in another distal end of the coupling wall 14 thereby forming a resilient tab 28 between the slots 26. A protrusion 30 is formed on an end of the resilient tab 28 of one supporting member 4 and is engagingly received in the notch 24 of the complementary supporting member 4.

Figure 5:
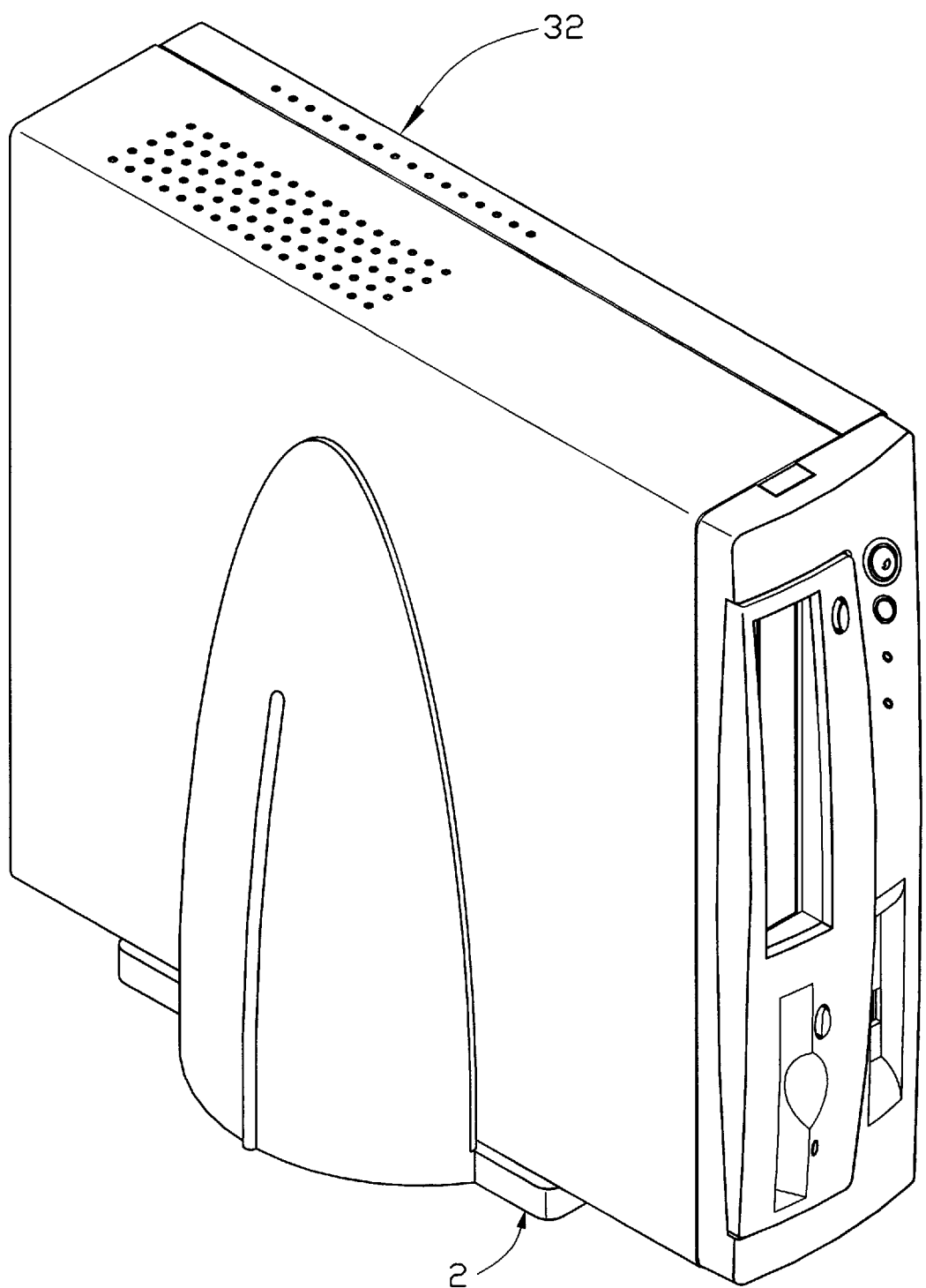
FIG. 5 is the stand of FIG. 1 with a computer supported thereby.

Referring to FIGS. 1, 4 and 5, the complementary supporting members 4 are coupled to form the stand 2 for supporting a computer 32. For facilitating description, the complementary supporting members 4 are respectively named a first supporting member 4a and a second supporting member 4b. The coupling wall 14 of the first supporting member 4a abuts against that of the second supporting member 4b. The dove-tail shaped protrusion 20 of the first supporting member 4a is engagingly received in the dove-tail shaped recess 22 of the second supporting member 4b. The dove-tail shaped recess 22 of the first supporting member 4a engagingly receives the dove-tail shaped protrusion 20 of the second supporting member 4b therein. The notch 24 of the first supporting member 4a engagingly receives the protrusion 30 of the second supporting member 4b therein. The protrusion 30 of the first supporting member 4a is engagingly received in the notch 24 of the second supporting member 4b. Thus, the complementary supporting members 4 are easily assembled to form the stand 2.

It is understood that the invention may be embodied in other forms without departing from the spirit thereof. Thus, the present example and embodiment are to be considered in all respects as illustrative and not restrictive, and the invention is not to be limited to the details given herein.

What is claimed is:

1. A stand adapted for supporting a computer, comprising:
   a first supporting member comprising
      a first base comprising a panel and a frame depending from the panel, the frame comprising a first coupling wall and forming a first protrusion extending from the first coupling wall, a first recess being defined in the first base by inward indention of the frame and exposed to the first coupling wall, wherein the first recess does not extend completely through the first base; and
      a first ledge extending upwardly from the first base; and
   a second supporting member comprising
      a second base comprising a panel and a frame depending from the panel of the second base, the frame of the second base comprising a second coupling wall for coupling to the first coupling wall and a second protrusion extending from the second coupling wall to be engagingly received in the first recess of the first supporting member, a second recess being defined in the second base by inward indention of the frame of the second base and exposed to the second coupling wall for engagingly receiving the first protrusion of the first supporting member, wherein the second recess does not extend completely through the second base; and
      a second ledge extending upwardly from the second base, the second ledge being spaced from the first ledge to cooperatingly receive a computer therebetween.

2. The stand as described in claim 1, wherein the first supporting member has a same structure as the second supporting member.

3. The stand as described in claim 1, wherein one of the first and the second coupling walls defines a pair of slots to form a resilient tab, the resilient tab having a third protrusion thereon, and wherein the other of the first and the second coupling walls defines a notch for receiving the third protrusion.

4. The stand as described in claim 1, wherein the first protrusion of the first supporting member is dove-tail shaped, and wherein the second recess of the second supporting member is dove-tail shaped.

5. The stand as described in claim 1, wherein the second protrusion of the second supporting member is dove-tail shaped, and wherein the first recess of the first supporting member is dove-tail shaped.

6. A stand adapted for supporting a computer, comprising:
   a first supporting member comprising
      a first base comprising a panel and a frame depending from the panel, the frame comprising a first coupling wall and forming a first protrusion extending from the first coupling wall, a first notch being defined in the first coupling wall; and
      a first ledge extending upwardly from the first base; and
   a second supporting member comprising
      a second base comprising a panel and a frame depending from the panel of the second base, the frame of the second base comprising a second coupling wall for coupling to the first coupling wall and a second protrusion for engagingly extending into the first notch of the first supporting member, a first recess being defined in the second base and exposed to the second coupling wall for engagingly receiving the first protrusion of the first supporting member, wherein the first recess does not extend completely through the second base; and
      a second ledge extending upwardly from the second base.

7. The stand as described in claim 6, wherein the first protrusion of the first supporting member is dove-tail shaped, and wherein the first recess of the second supporting member is dove-tail shaped.

8. The stand as described in claim 6, wherein the second coupling wall defines a pair of slots to form a second resilient tab for forming the second protrusion thereon.

9. The stand as described in claim 6, wherein the first coupling wall defines a pair of slots to form a first resilient tab for forming a third protrusion thereon, and wherein the second coupling wall defines a second notch for receiving the third protrusion.

10. The stand as described in claim 6, wherein a second recess is defined in the first base and exposed to the first coupling wall, and wherein a fourth protrusion extends from the second coupling wall to be engagingly received in the second recess of the first supporting member.

11. The stand as described in claim 10, wherein the fourth protrusion of the second supporting member is dove-tail shaped, and wherein the second recess of the first supporting member is dove-tail shaped.

12. The stand as described in claim 6, wherein the first supporting member has a same structure as the second supporting member.

* * * * *